US012782997B2

(12) United States Patent
Potenza et al.

(10) Patent No.: US 12,782,997 B2
(45) Date of Patent: Nov. 3, 2026

(54) METHOD FOR OPTICALLY COMPUTING BOOLEAN FUNCTIONS WITH M INPUTS AND RELATED ELECTRO-OPTICAL COMPUTING SYSTEM

(71) Applicant: UNIVERSITÀ DEGLI STUDI DI MILANO, Milan (IT)

(72) Inventors: Marco Potenza, Milan (IT); Bruno Paroli, Milan (IT); Paolo Milani, Milan (IT)

(73) Assignee: UNIVERSITÀ DEGLI STUDI DI MILANO, Milan (IT)

( * ) Notice: Subject to any disclaimer, the term of this patent is extended or adjusted under 35 U.S.C. 154(b) by 256 days.

(21) Appl. No.: 18/729,554

(22) PCT Filed: Feb. 1, 2023

(86) PCT No.: PCT/IB2023/050877
§ 371 (c)(1),
(2) Date: Jul. 17, 2024

(87) PCT Pub. No.: WO2023/148631
PCT Pub. Date: Aug. 10, 2023

(65) Prior Publication Data
US 2025/0068205 A1 Feb. 27, 2025

(30) Foreign Application Priority Data
Feb. 4, 2022 (IT) ........................ 102022000001982

(51) Int. Cl.
*G06E 3/00* (2006.01)
*G02F 3/00* (2006.01)

(52) U.S. Cl.
CPC ............... *G06E 3/005* (2013.01); *G02F 3/00* (2013.01)

(58) Field of Classification Search
None
See application file for complete search history.

(56) References Cited

U.S. PATENT DOCUMENTS 4,074,361 A * 2/1978 Clow ...................... G06E 3/001 359/107
2021/0080742 A1 3/2021 Ruan et al.
2021/0149337 A1* 5/2021 Wei ........................ G06N 20/00

OTHER PUBLICATIONS

International Search Report, issued in PCT/IB2023/050877, mailed May 8, 2023, Rijswijk, NL.

* cited by examiner

*Primary Examiner* — Dung T Nguyen
(74) *Attorney, Agent, or Firm* — ArentFox Schiff LLP; Michael Fainberg

(57) ABSTRACT

A method for optically computing a Boolean function with M inputs and related electro-optical computing system are provided. The system has a coherent or partially coherent light radiation source making M input light beams available, an optical modulation device generating modulated light beams, one or more light-diffusing devices receiving the modulated light beams, at least one electronic processing unit controlling the optical modulation device, and one or more electro-optical sensors. The method involves generating modulated light beams, making the modulated light beams available to the one or more light-diffusing devices to generate $2^M$ random or pseudo-random fields, deriving $2^M$ Boolean fields, each Boolean field including first points of an observation space representative of a logical 1, second points of the observation space representative of a logical 0, selecting a target Boolean function with M inputs, identifying active points between the first and second points that satisfy the selected target Boolean function, and computing the Boolean function.

15 Claims, 7 Drawing Sheets

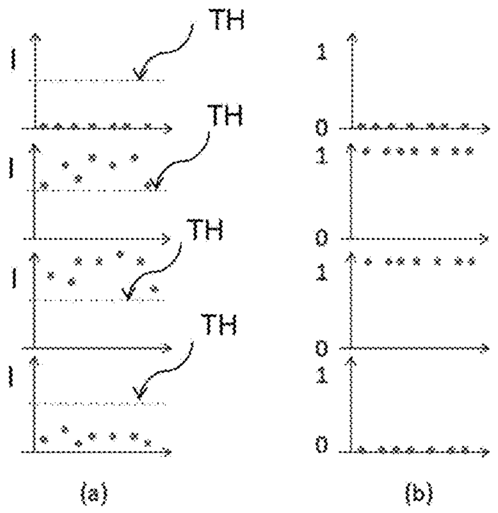
FIG. 3A
FIG. 3B
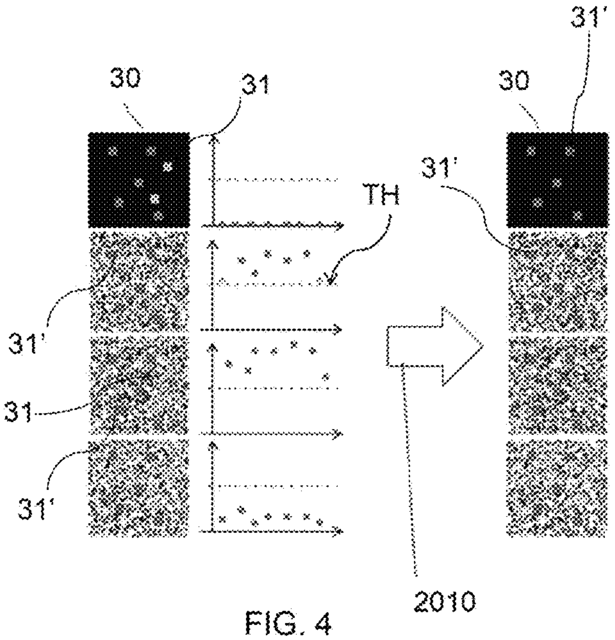
FIG. 4

METHOD FOR OPTICALLY COMPUTING BOOLEAN FUNCTIONS WITH M INPUTS AND RELATED ELECTRO-OPTICAL COMPUTING SYSTEM

CROSS-REFERENCE TO RELATED APPLICATIONS

This application is a National Phase Application of PCT International Application No. PCT/IB2023/050877, having an International Filing Date of Feb. 1, 2023 which claims priority to Italian Application No. 102022000001982 filed on Feb. 4, 2022, each of which is hereby incorporated by reference in its entirety.

FIELD OF APPLICATION

The present invention relates to a method for computing or optically generating one or more Boolean functions having one or more inputs, e.g., M inputs. The present invention also relates to an optical-electronic computing system for optically computing Boolean functions, which implements the method.

PRIOR ART

As known, the electronic devices used to perform computations and/or processings on digital data are characterized by limited execution speed. This is because the elementary electronic components forming the computing device, i.e., the transistors, have signal processing speeds limited by propagation delays of the signals themselves, determined by both the finite size of such electronic components and the presence of intrinsic capacitances in the components.

Signal propagation delays increase as the number of electronic devices connected to one another in cascade increases and thus increase in complex devices and apparatuses consisting of a multiplicity of transistors, such as logic gates and processors, for example.

To obviate such drawbacks, it has recently been suggested to use light radiation to transfer and process information.

Some recent technical solutions developed for this purpose aim to make devices equivalent to optical transistors, which can be combined to make complex computing devices, such as optical-type logic gates or optical processors, for example.

For example, some of these solutions utilize the constructive and destructive interference properties of optical cavities to modulate the light radiation intensity with which binary information can be associated: in the case of constructive interference, a higher level of light radiation intensity is associated with logical state “1”, and in the case of destructive interference, a lower level of light radiation intensity is associated with logical state “0”.

Other solutions utilize the non-linear optical effects of materials, such as crystals or liquid crystals, for example, to control the light radiation intensity or the direction of a main optical beam through a control beam.

However, such known optical solutions have the drawback that it is not possible to make an optical device similar to the transistor configured to implement complex apparatuses comparable, in terms of integration scale, with those obtainable using electronic devices and circuits.

Furthermore, common drawbacks of these merely optical approaches are in that it is currently not possible to combine multiple optical devices to make complex computing units while maintaining the small size of such units and logic gate fan-out values comparable to those which can be obtained using electronic devices. In particular, achieving a reasonable fan-out value, which is a parameter indicative of correct information transfer between components mutually connected in a cascade, is a limitation of such approaches.

In order to partially obviate such a drawback, hybrid solutions have been suggested, in particular to make electro-optical computers, in which optical-type information is first transformed into electrical-type information, the latter is processed by a conventional electronic processing unit, and the processing result is converted back into optical-type information.

Although such hybrid solutions allowed mitigating the drawbacks associated with the miniaturization of complex computing units and the transfer of information between components mutually connected in a cascade, the known electro-optical solutions still have limitations in terms of the maximum achievable computing speeds.

Therefore, the need is strongly felt for a solution to process digital data and information optically, in particular to compute a Boolean function optically, which allows overcoming the limitations and drawbacks of the traditional electro-optical solutions.

SUMMARY OF THE INVENTION

Therefore, it is the object of the present invention to provide a method for generating or optically computing one or more Boolean functions having one or more inputs, e.g., M inputs, which allows overcoming at least partially the limitations of the computing devices made with optical or electro-optical technology of known type.

Such an object is achieved by a method for optically computing a Boolean function with M inputs, with M≥1, as described and claimed herein.

The present invention also relates to an optical-electronic computing system for optically computing Boolean functions.

In a general exemplary embodiment, the computing system comprises:

- a coherent or partially coherent light radiation source (1) configured to make M input light beams (L, L1) available;
- an optical modulation device (3) adapted to generate modulated light beams (L2) from the M input light beams (L, L1);
- one or more light-diffusing devices (5) operatively associated with the optical modulation device (3) to receive the modulated light beams (L2);
- at least one electronic processing unit (9, 10) configured to control the optical modulation device (3);
- one or more electro-optical sensors operatively associated with the at least one electronic processing unit (9, 10).

Furthermore, the method of the invention (200) comprises the steps of:

- generating (201*a*), by the optical modulation device (3), the modulated light beams (L2) consisting of $2^M$ combinations of said M input light beams (L, L1), in each of said $2^M$ combinations, each input light beam (L, L1) can take an ON state (ON) or an OFF state (OFF);
- making (201*b*) the modulated light beams (L2) available to said one or more light-diffusing devices (5) to generate $2^M$ random or pseudo-random fields (20) each associated with a combination of the modulated light beams (L2), each random field is representative of a set of random light intensity variations of points in an observation space (S), each pseudo-random field is representative of a set of deterministic light intensity variations of points in the observation space (S);

deriving (201*c*), by the at least one electronic processing unit (9, 10) by means of the aforesaid one or more electro-optical sensors, $2^M$ Boolean fields (30) each associated with one of said $2^M$ generated random or pseudo-random fields, based on a comparison of the light intensity of the points of one or more regions of the observation space (S) associated with each of the $2^M$ random or pseudo-random fields with at least one threshold light intensity value (TH), each of said $2^M$ Boolean fields (30) includes:

first points of one or more regions of the observation space (S) in which the light intensity of the related random or pseudo-random field is greater than said at least one threshold light intensity value (TH), such first points are representative of a logical 1;

second points of said one or more regions of the observation space (S) in which the light intensity of the related random or pseudo-random field is lower than said at least one threshold light intensity value (TH), such second points are representative of a logical 0;

selecting (201*d*) a target Boolean function (F) with M inputs to be computed;

identifying (201*e*), by the at least one electronic processing unit (9, 10), active points (31) between the first and second points of each of the $2^M$ derived Boolean fields (30) which satisfy the selected target Boolean function with M inputs (F), such active points (31) optically encoding the Boolean function with M inputs;

computing (202), by the electro-optical computing system (100), the Boolean function with M inputs based on said selected first active points (31).

The method of the invention and the related computing system advantageously ensure higher computing speeds than those achievable with the known solutions.

Furthermore, the method described above and the related computing system can be used to generate elementary Boolean functions, such as the Boolean algebra NOT, OR, AND, XOR, EXOR functions, or complex Boolean functions, for example. Such elementary functions can be combined to formulate further Boolean functions.

Preferred and advantageous embodiments of the method for optically computing a Boolean function and the related optical-electronic computing system are the subject of the dependent claims.

BRIEF DESCRIPTION OF THE DRAWINGS

Further features and advantages of the invention will be apparent from the following description of preferred embodiments thereof, given by way of non-limiting indication, with reference to the accompanying drawings, in which:

FIGS. 3A-3B illustrate light radiation intensities of the active zones of random or pseudo-random fields and light radiation intensities of the corresponding Boolean fields relating to the optical implementation of the Boolean EXOR function in FIG. 2, respectively;

FIG. 4 diagrammatically illustrates an example of an operation performed in an error reducing step of the method of the invention which optically computes the two-input Boolean EXOR function in FIG. 2;

Similar or equivalent elements in the aforesaid figures are indicated by the same reference numerals.

DETAILED DESCRIPTION

Figure 1:
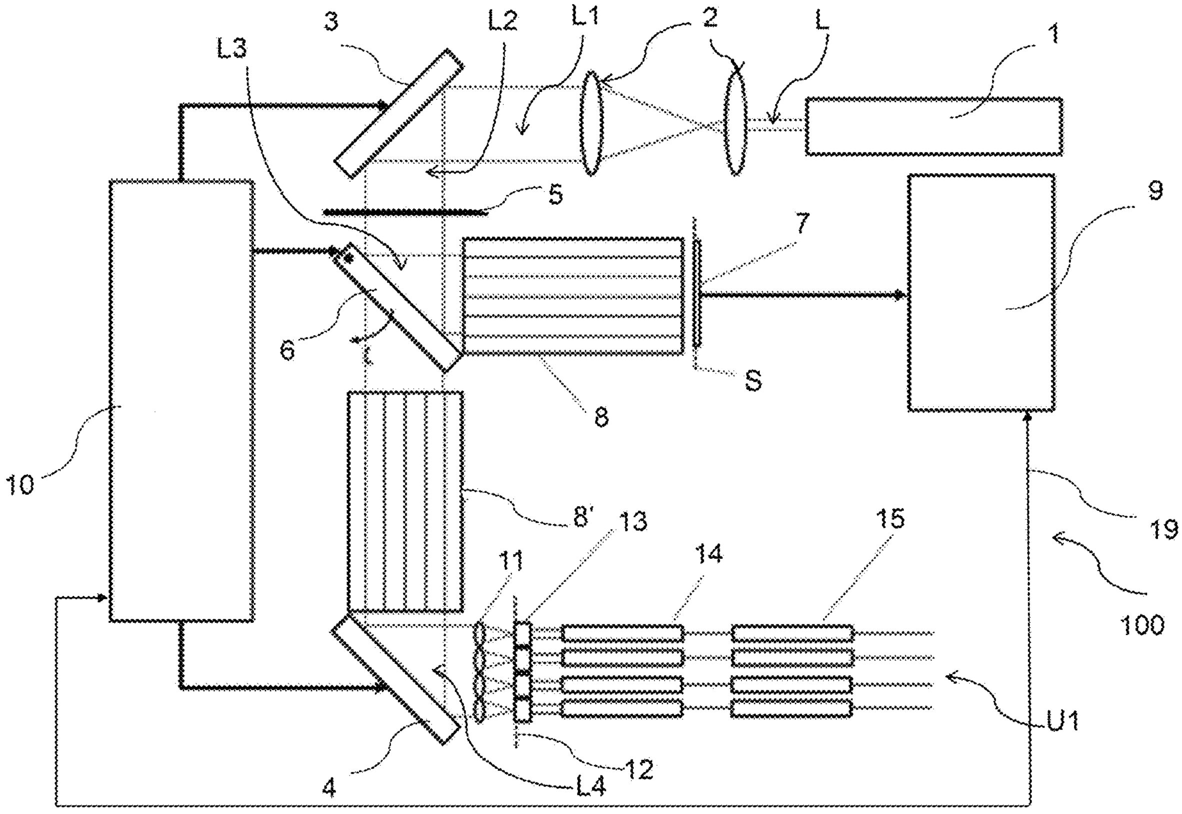
FIG. 1 diagrammatically illustrates an exemplary embodiment of an optical-electronic computing system configured to implement the method for optically computing one or more Boolean functions of the present invention.

With reference to FIG. 1, an example of an electro-optical computing system configured to implement the method 200 for optically computing a Boolean function with M inputs, with M≥1, of the present invention, or for simultaneously computing multiple Boolean functions, is indicated by reference numeral 100 as a whole.

Such a method 200 for optically computing one or more Boolean functions of the present invention is described with reference to FIGS. 2, 3A-3B, 4, 5, 6, 7, 8.

In the following description, the term random field is used to denote a set of random light intensity variations of points in an observation space S.

The term pseudo-random field is used to denote a set of deterministic light intensity variations of points in the observation space S.

In other words, the random field is not known and needs to be characterized, while the pseudo-random field has known features.

Observation space S means both the three-dimensional space or 3D space and any subset of the three-dimensional space, such as a plane or any 2D surface, a sphere, a line, or any disjointed region of the three-dimensional space. In a particular, but not limiting exemplary embodiment, the observation space S is the surface of a charge-coupled sensor or CCD (Charge-Coupled Device) sensor.

Note that the random or pseudo-random field can be larger than the observation space S. Therefore, the observation space S allows accessing a portion of the random or pseudo-random field.

In general, the suggested method 200 consists in using electromagnetic radiation of coherent or partially coherent type, i.e., a coherent or partially coherent light beam generated by a single source 1, typically a laser source. Alternatively, the method 200 uses independent coherent or partially coherent M sources obtained by splitting the coherent light beam generated by the source itself into a plurality of light beams. Such M light beams are the M inputs of the electro-optical computing system 100 mentioned above.

In the present invention, light beam means a combination of light rays.

The aforesaid electromagnetic radiation of coherent or partially coherent type is, for example, a radiation in the visible spectrum, or an infrared or ultraviolet radiation.

In general terms, with reference to FIG. 1, the electro-optical computing system or system 100 comprises the coherent or partially coherent light radiation source 1 configured to make M input light beams L, L1 available.

In particular, each light beam can be ON or OFF irrespective of the others, therefore it is possible to associate the ON light beam with the logical state "1" and the OFF light beam with the logical state "0".

Furthermore, the system 100 comprises an optical modulation device 3 adapted to generate modulated light beams L2 from the M input light beams L, L1. The system 100 further comprises one or more light diffusing devices 5 operatively associated with the optical modulation device 3 to receive modulated light beams L2 and at least one electronic processing unit 9, 10 configured to control such an optical modulation device 3. Furthermore, the system 100 comprises one or more electro-optical sensors operatively associated with at least one electronic processing unit 9, 10.

In particular, the modulated M light beams L2 are configured to propagate in a free space or can optically guided, using optical fiber cables, towards the aforesaid one or more diffusers 5 to generate random or pseudo-random fields which are used for the computation by means of the method 200 of the invention.

In other words, the random or pseudo-random fields are generated by the aforesaid one or more diffusing devices 5 in the observation space S, e.g., a three-dimensional observation space.

Further structural features of the system 100 will be described in greater detail below.

Figure 7:
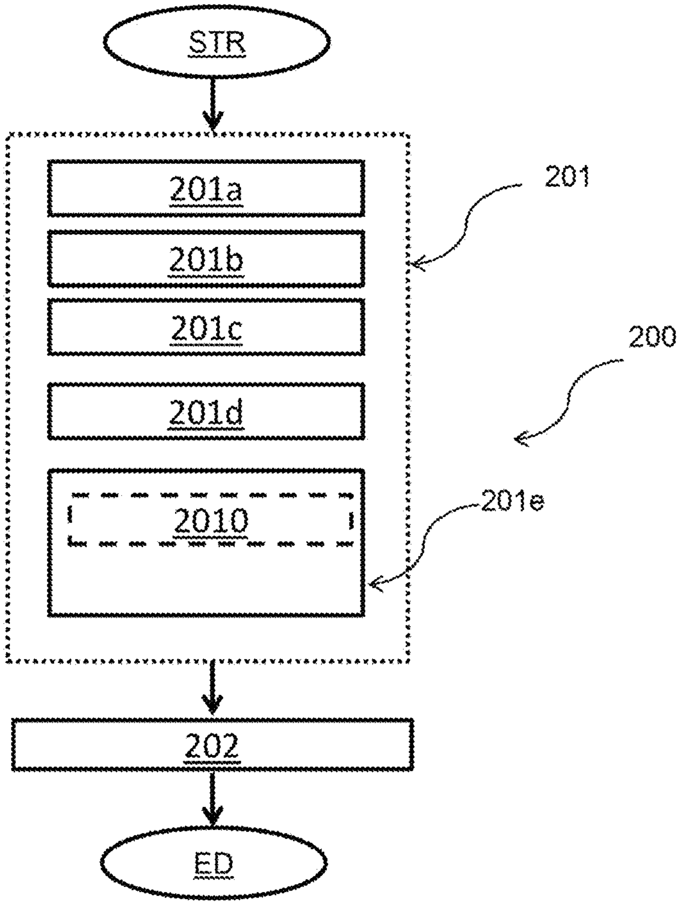
FIG. 7 illustrates, with a flowchart, the operational stages of the method for optically computing a Boolean function according to the invention.

A general exemplary embodiment of a method 200 for optically computing a Boolean function with M inputs, with M≥1, of the invention is illustrated with a flowchart with reference to FIG. 7. The method begins with a symbolic starting step STR and ends with a symbolic ending step ED.

Such a method 200 comprises operational steps which end with the computation or generation of one or more Boolean functions with M inputs. Such operational steps comprise: an encoding step, an error reducing step, a superimposing step, and a computing step.

With reference to FIGS. 2, 3A, 3B, and 7, the method 200 comprises a step of generating 201*a*, by the optical modulation device 3, modulated light beams L2 consisting of $2^M$ combinations of said M input light beams L, L1. In each of the $2^M$ combinations, each input light beam L, L1 can take either an ON state (ON) or an OFF state (OFF).

Furthermore, the method 200 includes a step of making 201*b* the modulated light beams L2 available to the aforesaid one or more light-diffusing devices 5 to generate $2^M$ random or pseudo-random fields 20, each associated with a combination of the modulated light beams L2.

Furthermore, the method 200 includes a step of detecting 201*c*, by the at least one electronic processing unit 9, 10, by means of the aforesaid one or more electro-optical sensors, $2^M$ Boolean fields 30 each associated with one of the generated $2^M$ random or pseudo-random fields, based on a comparison of the light intensity of points in one or more regions of the observation space S associated with each of the $2^M$ random or pseudo-random fields with at least one threshold light intensity value TH.

Note that each of the $2^M$ Boolean 30 fields includes:

- first points of one or more regions of the observation space S in which the light intensity of the related random or pseudo-random field is greater than the at least one threshold light intensity value TH; therefore, such first points are representative of a logical 1;
- second points of said one or more regions of the observation space S in which the light intensity of the related random or pseudo-random field is lower than the at least one threshold light intensity value TH; therefore, such second points are representative of a logical 0.

The method 200 further comprises a step of selecting 201*d* a target Boolean function F with M inputs to be computed.

Additionally, the method 200 allows identifying 201*e*, by the at least one electronic processing unit 9, 10, active points 31 between the first and second points of each of the derived $2^M$ Boolean functions 30 which satisfy the selected target Boolean function F with M inputs.

In other words, such active points 31 are an optical encoding of the Boolean function with M inputs, and the steps of the method 200 described above collectively form an encoding step 201 of the method of the invention.

Note that the comparison process with at least one threshold value TH of the encoding step 201 consists in applying at least one threshold value for each combination of the M inputs so that all the points in the region or regions of the observation space S will be considered 1 (or 0 in the case of negated Boolean fields) if the radiation intensity of the random or pseudo-random field is above such at least one threshold TH or will be considered 0 (or 1 in the case of Boolean negated fields) if the radiation intensity of the random or pseudo-random field is below the at least one threshold TH.

In an exemplary embodiment, the method 200 includes the step 201*c* of deriving $2^M$ Boolean fields 30, each associated with one of said generated $2^M$ random or pseudo-random fields 20, comprising a step of comparing the light intensity of the points of one or more regions of the observation space S associated with each of the $2^M$ random or pseudo-random 20 fields with a first TH1 and at least a second TH2 threshold light intensity values.

In this case, each of the $2^M$ Boolean fields 30 includes:

- further first points of one or more regions of the observation space S in which the light intensity of the related random or pseudo-random field is between the first TH1 and the at least a second TH2 threshold light intensity values; therefore, the further first points are representative of a logical 1;
- further second points of such one or more regions of the observation space S in which the light intensity of the related random or pseudo-random field is outside the light intensity range delimited by the aforesaid first TH1 and at least a second TH2 threshold light intensity value; therefore, the further second points are representative of a logical 0.

The Boolean fields 30 derived in the encoding step 201 can be formally indicated by the expression $$Ci(x): S \subseteq R^3 \text{ -> } [0, 1] \tag{1}$$

where Ci are the Boolean fields, x denotes the spatial coordinates of the Boolean fields, S is the observation space, and i denotes the combination of the inputs $i=(a_1, \ldots, a_M)$, where $a_1, \ldots, a_M$ denote the Boolean inputs.

The encoding step 201 of the method 200 comprises the step of identifying 201*e* the points or portions of the observation space S so that the target Boolean function F is satisfied from the derived Boolean fields 30.

Note that the target Boolean function F is a relation which associates each combination of the inputs i with one and only one value of the output. Since the function is Boolean, the values of the output can take the logical values 1 or 0.

In general, the target Boolean function F can be defined by the relation:

$$F(i)\colon B^M \text{->} \{0,1\} \tag{2}$$

where B={0,1} is the set of Boolean values.

Therefore, the points or portions of the region or regions of the observation space S which satisfy the target Boolean function F are the points of the space S which satisfy the relation:

$$x\colon F(i)=C_i(x)\forall\, i \tag{3}$$

From the above and based on the equation (3), it is noted, in more detail, that the active points 31 are the points x of the observation space S so that, for each combination of the inputs i, the value of the target Boolean function F (function of i) is equal to the value of the Boolean field Ci (generated by the combination i) at the point x.

Therefore, the above step of identifying 201*e* the active points coincides with a step of tracing the points x of the observation space S so that, for each combination of the inputs i, the value of the target Boolean function F (function of i) is equal to the value of the Boolean field Ci (generated by the combination i) at the point x. Such an operation of identifying active points is performed by the processing unit 9, 10 for any point in the observation field x, in particular verifying the equation (3) shown above, i.e., verifying the equivalence F(i)=Ci(x) for any combination of the inputs.

If such an equation at point x is valid for any combination of the inputs, the considered point x will then be identified as an active point 31. Conversely, if for only one combination of the inputs the equivalence F(i)=Ci(x) at point x is not valid as well, then such a point will not be an active point and can be indicated as an inactive point.

Furthermore, as already disclosed above, the diffused light beams are such as to form randomly or pseudo-randomly varying intensity distributions in the observation space S. Although such intensities are random or pseudo-random, by means of step 201*c* it is possible to derive the $2^M$ Boolean fields, one for each combination of the inputs. Such Boolean fields are distributions of "1" or "0" values in the observation space.

Therefore, knowing the Boolean fields and the target function F, it is possible to discriminate the active points 31 from the inactive points by verifying the aforesaid equation (3) by means of the processing unit 9, 10. In other words, identifying the active points means identifying the position x of such points in the observation space S utilizing the equation (3).

The active points do not need be mutually separated, indeed they can even cover a continuous area of the observation space S. However, all such active points need to satisfy the equation (3), which can be verified by the processing unit 9,10.

From an application point of view, the invention includes making an electro-optical computing system comprising one or more electro-optical sensors distributed in the three-dimensional 3D observation space S. In particular, such sensors can be distributed without necessarily following a well-defined surface. Note that in the example in FIG. 1, the observation space S is two-dimensional (2D) because it coincides with the plane of the CCD sensor.

Each sensor is configured to measure the intensity of the random or pseudo-random fields at a given location x of the three-dimensional observation space S. From such intensities, it is possible to derive the Boolean fields at the various positions x of the sensors, by means of the processing unit 9, 10.

Furthermore, using the equation (3), the active points 31 can be identified by means of the processing unit 9, 10. Such electro-optical system sensors, located in the observation space S, are operatively associated with the processing unit 9, 10. Therefore, it is reiterated that such a processing unit 9, 10 is adapted to verify the equation (3) at every point x and for every combination of the inputs i.

In addition, it is worth noting that the active points 31 in the observation space are not known beforehand. Therefore, with the present invention, it is not necessary to place the electro-optical sensor before or after a given point. Indeed, the step of identifying 201*e* the points or portions of the observation space S so that the target Boolean function F is satisfied from the derived Boolean fields (i.e., the active points) is adapted to determine whether the electro-optical sensor is at an active point or an inactive point.

After the aforesaid encoding step 201, the method 200 of the invention includes a general step of computing 202, by the electro-optical computing system 100, the Boolean function with M inputs based on the identified active points 31.

Figure 8:
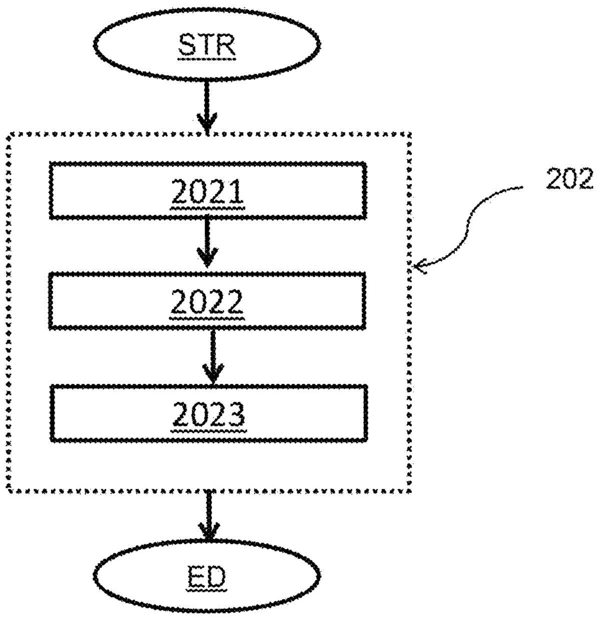
FIG. 8 illustrates, with a flowchart, the operational stages of a superimposing step of the method of the invention for optically computing a Boolean function in FIG. 7.

Exemplary embodiment of such a computing step 202 are described with reference to FIGS. 5, 6, 8 and the example of the optical-electronic computing system in FIG. 1.

In an exemplary embodiment, such a computing step 202 of the method comprises the further steps of:

- conveying 2021 first light beams L4 associated with the active points 31 identified for each of the $2^M$ Boolean fields 30 to a detection region 12 of the system 100;
- comparing 2022 the light intensity conveyed into the detection region 12 at least one activation light intensity threshold value THa;
- associating 2023 with an output state U1 the Boolean function with M inputs:

a logical value 1 when the light intensity conveyed into the detection region 12 is greater than the at least one activation threshold THa, or a logical value 0 when the light intensity conveyed into the detection region 12 is lower than the at least one activation threshold value THa.

In a particular exemplary embodiment, the aforesaid conveying step 2021 comprises the further steps of:

- diffusing said modulated light beams L2 towards a further optical modulation device 4 of the system 100;
- deviating, by the further optical modulation device 4, the first light beams L4 associated with the identified active points 31 at least one converging lens 11;
- concentrating, by such at least one converging lens 11, the diverted first light beams L4 to generate first light beams L5 conveyed towards the aforesaid detection region 12.

The steps described above form a superimposing step of the method 200 of the invention. During the superimposing step, the light from the active zones 31, identified in the encoding step 201, is conveyed either totally or partially (according to the value of the thresholds) towards the detection region 12.

Advantageously, the intensity of the light conveyed into the detection region 12 is the result of the computing of the Boolean function with M inputs. Such a conveyed light intensity allows discriminating and recognizing the condition in which such an intensity exceeds the activation threshold THa as the logical state 1 of the Boolean function (or 0 in the case of the negated Boolean function) and recognizing the condition in which such an intensity is below the activation threshold THa as the logical state 0 of the Boolean function (or 1 in the case of the negated Boolean function).

In an exemplary embodiment of the method 200, the aforesaid comparing step 2022 comprises the further steps of:

- detecting, through first electro-optical sensors 13 of the system 100, e.g., one or more photodiodes, the light intensity conveyed into the detection region 12 to convert it into an electrical signal E;
- amplifying, by means of the electronic amplification means 14, e.g., an amplifier, the electrical signal E to generate a first electrical signal E1;
- comparing the first electrical signal E1 with at least one electrical activation threshold value ETHa associated with electronic comparison means 15, e.g., one or more threshold comparators; such at least one electrical activation threshold value ETHa is representative of the at least one activation light intensity threshold value THa mentioned above.

In a particular exemplary embodiment, the comparing step comprises the step of comparing the first electrical signal E1 with a first ETHa1 and at least a second ETHa2 electrical activation threshold values representative of a first THa1 and at least a second THa2 activation light intensity threshold values, respectively.

Based on the above, the output states U1 of the Boolean function to be computed are converted into electrical signals to make the computation compatible with any electronic circuits.

Note that the activation threshold THa, associated with the electronic comparison means 15, is chosen so that the target Boolean function F is satisfied, i.e., the activation threshold THa is chosen so that it is less than the intensity of the light conveyed on the detection region 12 when the value "1" of the Boolean function (or "0" in the case of the negated function) is expected, even considering the intensity fluctuations due to drifts or noise. Conversely, the activation threshold THa is chosen so that it is higher than the light intensity conveyed on the detection region when the value "0" (or "1" in the case of the negated function) of the Boolean function is expected even considering the intensity fluctuations due to drifts or noise.

In an alternative exemplary embodiment, the method 200 involves two or more activation thresholds associated with the electronic comparison means 15. However, such thresholds are chosen so that the target Boolean function F is satisfied.

In particular, in the case of two activation thresholds THa1, THa2, such thresholds are chosen so that the light intensity conveyed onto the detection region 12 is between such two thresholds when the value 1 of the Boolean function is expected (or 0 in the case of the negated function). Conversely, the light intensity conveyed onto the detection region 12 is provided to be outside the range between the two activation thresholds THa1, THa2 when the value 0 (or 1 in the case of the negated function) of the Boolean function is expected.

Even in the case of multiple activation thresholds, such thresholds are chosen so that the target Boolean function F (or the target Boolean function negated) is satisfied.

Note that the solution of the target Boolean function F with the suggested method 200 is ensured by the fact that, during the encoding step 201, the very points or portions of the Boolean fields 30 which satisfy the target Boolean function F were sought, i.e., the active zones 31 which intrinsically satisfy the function by means of the application of the single, double or multiple thresholds to the corresponding random or pseudo-random fields 20.

Furthermore, the superimposing step of the method advantageously allows implementing various target Boolean functions: in order to implement these functions, it is sufficient to channel the light radiation of the active zones 31 corresponding to the target function into the detection region 12.

Furthermore, the superimposing step of the method is useful for increasing the rejection to noise and drift by superimposing multiple regions which satisfy the same Boolean function.

In an exemplary embodiment of the method, in the case of a single threshold, the activation light intensity threshold THa is computable with the equation:

$$THa = N * TH * K \tag{4}$$

where N is the number of active zones 31 conveyed towards the detection region 12, TH is the at least one threshold light intensity value, k is an attenuation constant indicating by how much the active zone light intensity 31 is attenuated in the light transfer from the active zone to the detection region 12.

In a further exemplary embodiment, in the case of a number of activation thresholds either greater than or equal to two, the activation light intensity threshold THaj is computable with the equation:

$$THaj = N * THj * k \tag{5}$$

where THj denotes the light intensity threshold values used in the aforesaid comparison 201*c* with j=1, 2, 3, 4 . . . .

Referring to FIGS. 7 and 4, in an optional exemplary embodiment of the method 200 of the invention, the aforesaid identifying step 201*e* comprises the further steps of:

- selecting 2010, for each of $2^M$ combinations of the M input light beams L, L1, from among the active points 31 which optically encode the Boolean function with M inputs, first active points 31' for each of which a modulus of the difference between the light intensity of the random or pseudo-random field at said active point and the at least one threshold light intensity value TH is always greater than a preset positive parameter P;
- computing 202, by the electro-optical system of computation 100, the Boolean function with M inputs based on the aforesaid first selected active points 31'.

In this manner, the computing step 202 of the method 200 of the invention is performed to comprise the further steps of:

- conveying 2021 first light beams L4 associated with the first active points 31' identified for each of the $2^M$ Boolean fields 30 to a detection region 12;
- comparing 2022 the light intensity conveyed into the detection region 12 at least one activation light intensity threshold value THa;
- associating 2023 with an output state U1 the Boolean function with M inputs:

a logical value 1 when the light intensity conveyed into the detection region 12 is greater than such at least one activation threshold THa, or a logical value 0 when the light intensity conveyed into the detection region 12 is lower than such at least one activation threshold value THa.

The steps of the method 200 described above form an error reducing step. Such an error reducing step allows selecting active points or portions so as to advantageously reduce the possibility of making computing errors in the case of particularly unstable or noisy systems.

The error reducing step can be ignored if the computing system is particularly stable and low-noise or if the active zones are large enough that variations in the random or pseudo-random field intensities in the active zones due to noise or drifts are negligible, i.e., the noise or drifts are negligible compared to the modulus of the difference between the random or pseudo-random field intensities at the considered active point or portion and the threshold value, for each combination of the inputs and for each active zone.

The computing step of the method 200 of the invention includes computing or optically implementing the target Boolean functions F with M inputs, using the M light beams (ON or OFF) as the inputs of the Boolean functions according to the computation needs and the intensity conveyed into the detection region 12 as the output. The function implemented according to the suggested method will correspond to the target function (or multiple target functions if multiple encoding and error reducing steps are taken).

Example of Application of the Method

With reference to FIGS. 2, 3A-3B, 4, 5, 6, a sequence of operations relating to the method 200 of the invention which optically computes a two-input EXOR target Boolean function, i.e.: F(0,0)=0, F(0,1)=1, F(1,0)=1, F(1,1)=0, is described below.

Figure 2:
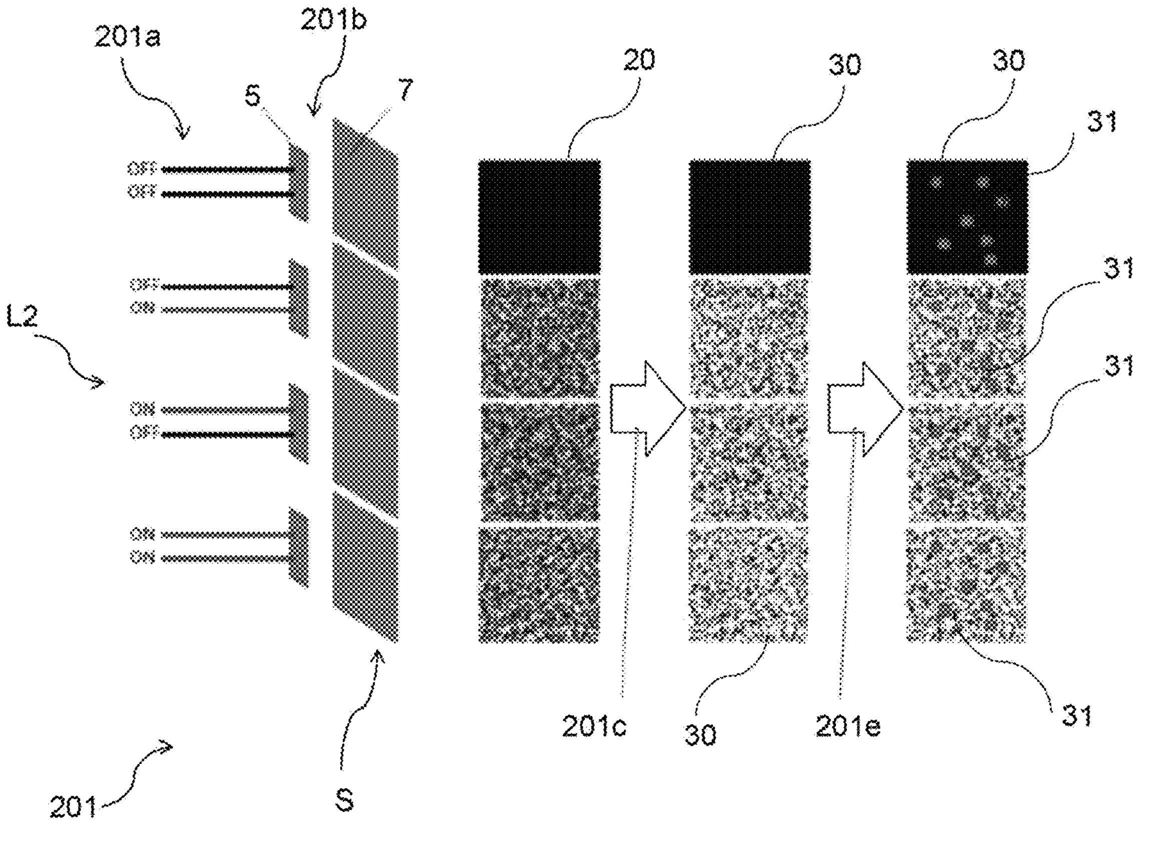
FIG. 2 diagrammatically illustrates an example of a sequence of operations performed in an encoding step of the method of the invention which optically computes a two-input Boolean EXOR function.

In particular, with reference to FIG. 2, the encoding step 201 includes the sequential activation 201*a* of the two mutually separated input light beams L2 using any optical modulator, e.g., of the electro-optic or acoustic-optic type, or by optical shutters.

In this manner, it is possible to achieve the four possible combinations of the inputs to generate 201*b*, through a diffuser 5, random or pseudo-random fields 20 which are acquired in the observation space S. Such an observation space S is made, for example, in a plane 7 of a charge-coupled sensor, or charge-coupled device, CCD, of a digital camera.

From the aforesaid generated random or pseudo-random fields 20, there is included a next step 201*c* of deriving, by a processing unit 9, 10, four corresponding Boolean fields 30 associated with the aforesaid random or pseudo-random fields, based on a comparison with at least one threshold light intensity value TH.

Furthermore, once the target Boolean function F, i.e., the EXOR function, has been selected, there is included a step of identifying 201*e* the active zones 31 associated with each of the identified Boolean fields 30 using the processing unit 9, 10 of the system 100.

Note that, in this example, the encoding step 201 is performed during the system manufacturing process.

Furthermore, in the case of pseudo-random fields, it is not necessary to use the plane 7 of a charge-coupled sensor (CCD) because the intensity field distribution produced by the diffuser 5 is known beforehand. However, the encoding step 201 is useful for identifying the active zones 31 which satisfy the EXOR function utilizing, for example, the processing unit 9, 10 which applies the above-mentioned thresholds to the known pseudo-random field.

FIGS. 3A, 3B show the intensities I of the active zones 31 of the random and pseudo-random fields 20 and the corresponding derived Boolean fields 30 with reference to FIG. 2. Note that the intensities I of each active zone of the four random or pseudo-random fields generate, by means of the comparison process with the at least one threshold TH, four corresponding Boolean fields 30 which satisfy the target Boolean function F as described by the equation (2).

FIG. 4 illustrates the error reducing step of the method. The active zones 31 very close to the threshold TH are excluded. In other words, only the active zones 31 sufficiently far from the threshold TH forming the first active zones 31' are selected. Therefore, in the example, the five first 31' out of seven active zones are selected.

Figure 5:
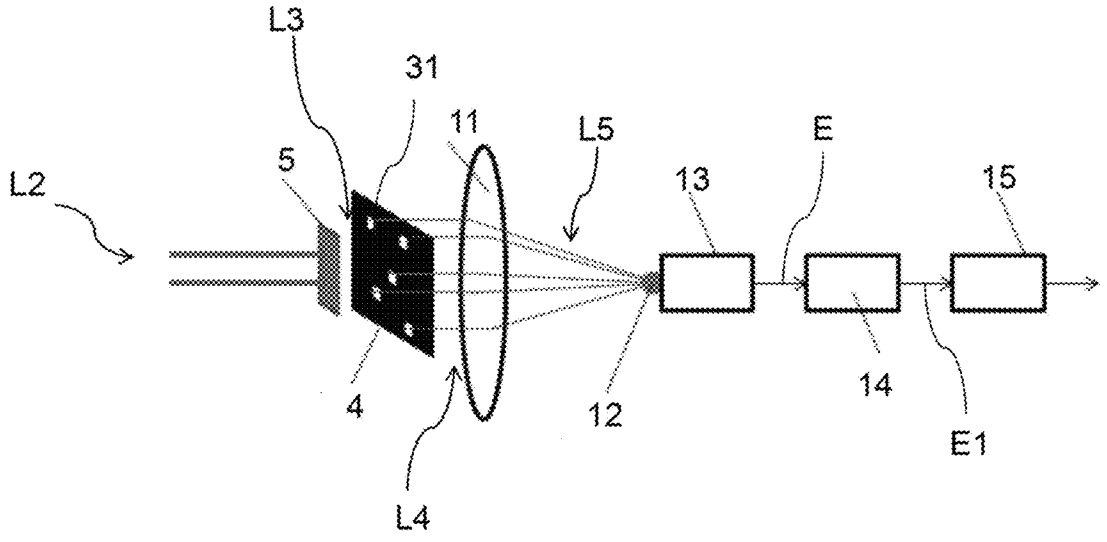
FIG. 5 diagrammatically illustrates an example of operations performed in a superimposing step of the method of the invention for optically computing a Boolean function.

FIG. 5 illustrates the superimposing step of the method 200 which is implemented by the electro-optical system 100. Such a step involves the use of the additional spatial light modulator 4 positioned at the spatial region of observation S (region or plane of detection of the CCD sensor).

Such a further spatial light modulator 4 is configured to transmit only the random or pseudo-random field light towards the converging lens 11 at the active zones 31, 31'. The lens 11 is adapted to convey the radiation (of the active zones only) towards the detection region 12 close to the focus of the lens.

The comparison with the activation threshold THa is implemented by means of a photodiode 13 which measures the power or intensity in the detection region 12 and converts it into an electrical signal E which is amplified to generate an initial electrical signal E1 to be applied to a threshold comparator 15.

The activation threshold is chosen by following the relation (4), in which the constant k=A*R*G takes into account: the light attenuation A from the active zone 31 to the detection region 12, the power-current conversion constant R of the photodiode 13, and the gain G of the amplifier 14. Thus, the threshold of the comparator 15 implements one or more of the activation thresholds THa, chosen according to the criteria described in the superimposing step.

Figure 6:
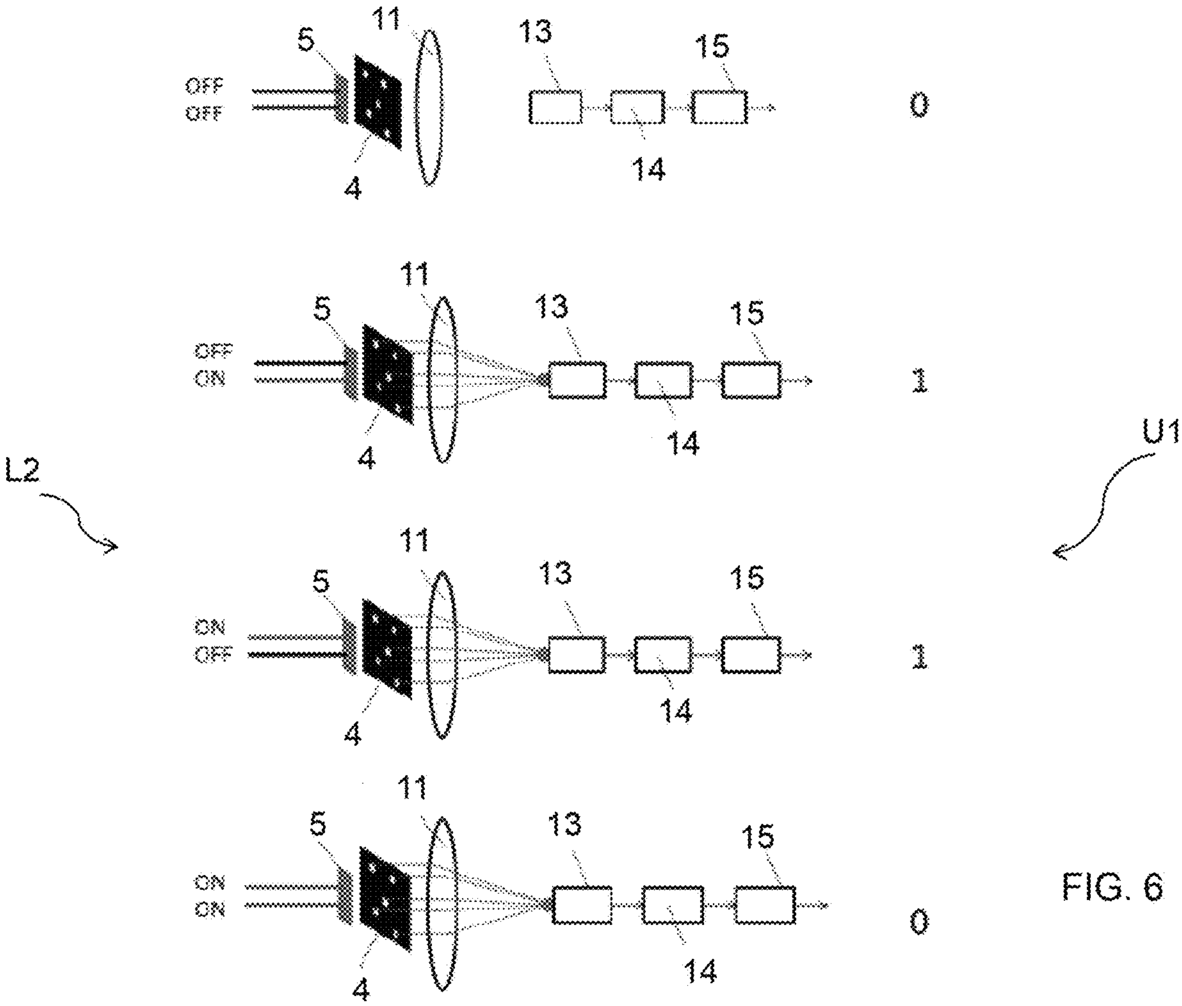
FIG. 6 diagrammatically illustrates a computing step of the method of the invention for optically computing the two-input EXOR Boolean function in FIG. 2.

FIG. 6 shows the computing step of the method 200 of the invention in which, for any combination of the two inputs, the target function F, i.e., the EXOR function, is correctly computed.

The Applicant notes that, in particular, once the encoding 201 has been performed, the aforesaid computing step to compute the EXOR function is extremely fast. Indeed, as the transmission of the light beams associated with the active zones 31, 31' of the random or pseudo-random fields to the converging lens 11 occurs at the speed of light, the only propagation delays are substantially determined by the photodiode 13, the amplifier 14, and the comparator 15. However, these electronic devices, are very fast because they are made with elementary electronic components used for applications in telecommunications having clock frequencies above 10 GHz.

Example of an Optical-Electronic System

Referring to FIG. 1, an example of an optical-electronic computing system 100 configured to implement the method 200 for optically computing one or more Boolean functions, e.g., with M inputs, of the present invention is described below in greater detail.

The electro-optical computing system or simply system 100 comprises a coherent or partially coherent source 1 of the light beams L, e.g., a laser source, where such a laser comprises M light beams with M≥1.

The system 100 optionally includes a collimator device 2 adapted to generate collimated M laser beams L1 from the laser beam L emitted by source 1.

Such M beams laser L, L1 are the M inputs of the electro-optical computing system 100.

Furthermore, the system 100 comprises an optical modulation device or spatial light modulator or modulator 3, adapted to generate modulated light beams L2 from the M input light beams L, L1.

For example, the spatial light modulator 3 is embodied by the DLP 6500 modulator from Texas Instruments.

Such a spatial light modulator 3 is controlled by at least one electronic processing unit 9, 10 of the system 100 to separate the M input laser beams L1 into M×N groups of laser beams L2 from individual pixels or groups of pixels associated with the modulator 3. In other words, the modulator 3 is configured to generate M×N groups of modulated laser beams L2.

The example in FIG. 1 shows a first 10 and a second 9 electronic processing units which are mutually independent and connected by a data communication line 19. In another exemplary embodiment, the system 100 can comprise a single electronic processing unit.

Note that the M×N groups of laser beams L2 are the inputs of N devices which implement or compute N Boolean functions with M inputs according to the method 200 of the invention.

The system 100 further comprises one or more light-diffusing devices 5 associated with the optical modulation device 3 to receive the modulated light beams L2.

In particular, the modulator 3 is configured to turn on or off each of the aforesaid groups of modulated laser beams L2 irrespective of the others by deviating the input laser radiation L1 towards the aforementioned one or more diffusers 5 (logic state 1 or ON) or to an absorber (logic state 0 or OFF), not shown in FIG. 1.

In an alternative exemplary embodiment, the input laser beam L, L1 can be split into multiple sub-beams by means of a beam-splitter device. Such sub-beams exiting from the beam-splitter can be appropriately modulated by any optical modulator, e.g., of electric-optic or acoustic-optic type, or by optical shutters.

Furthermore, the system 100 comprises a light-reflecting element 6, e.g., a mirror, and the groups of laser beams exiting from the diffuser 5, i.e., the diffused laser beam groups L3 exiting from the diffuser 5, propagate in the free space towards such a mirror 6. In particular, such a mirror 6 is reversibly movable, by the first electronic processing unit 10, from a first operating position in which laser beam groups L3 exiting from the diffuser 5 are conveyed towards an observation space S to a second operating position.

When the mirror 6 is in the aforesaid first operating position, such a mirror is configured to reflect the diffused laser ray groups L3 towards the S observation space which is made, for example, in a plane 7 of a charge-coupled device (CCD) sensor of a digital camera. Such a charge-coupled sensor is an electro-optical sensor operatively associated with the electronic processing unit 9, 10.

In a different exemplary embodiment, such a light reflection element 6 is embodied by a beam splitter which, with respect to the mirror, is in a fixed position and does not need to be moved.

Each of the laser groups L3 diffused towards the plane 7 of the CCD sensor is configured to generate a respective random or pseudo-random 20 field in the observation space S.

Furthermore, to ensure that the various diffused laser beam groups L3 remain separate from each other and thus independent, the system 100 involves the use of first separators 8, for example made of absorbent material, placed between the diffuser 5 and the observation space S. Such an absorbent material generally comprises blackened material, paper, plastic, metal (e.g., black anodized aluminum) configured to absorb laser radiation well.

The digital camera in the observation space S is operatively associated with the second electronic processing unit 9 of the traditional type adapted to select the regions of $2^M$ random or pseudo-random fields in the observation space S as specified in the encoding and error reducing steps of the method 200 of the invention.

The modulator 3 is configured to sequentially turn on or off the input laser beam groups L1 to generate modulated laser beams L2 in an encoding step of the method of the invention by deviating such beams towards the diffuser 5.

By means of the second electronic processing unit 9 and the camera, the system 100 is configured to select the active zones 31 which satisfy the target Boolean function F which is desired to be computed, in particular by setting appropriate thresholds TH in the aforesaid encoding step.

In an exemplary embodiment, the aforementioned second electronic processing unit 9 of the system 100 is also configured to select the first active zones 31' in the error reducing step of the method 200.

Once the active zones 31, 31' have been selected, the system 100 is configured to perform a superimposing step of the method 200 in which the mirror 6 is moved to take the second operating position.

In such a second operating position of the mirror 6, the laser beam groups L3 diffused by the diffuser 5 are directly conveyed to a further spatial light modulator or further modulator 4, e.g., of a similar type as the spatial light modulator 3.

In order to ensure that the various diffused laser beam groups L3 remain mutually separate and thus independent, the system 100 comprises second separators 8', similar to the first separators 8, placed between the diffuser 5 and the further spatial light modulator 4. In particular, such second separators 8' are configured to send the separate laser beam groups on the further modulator 4 to generate the first laser beams L4.

To ensure that the random or pseudo-random fields generated on observation plane 7 have the same distribution as the random or pseudo-random fields on the additional spatial light modulator 4, the system 100 is designed to ensure that the distance between the mirror 6 and the camera is equal to the distance between the mirror 6 itself and such a further spatial light modulator 4.

Furthermore, the system 100 comprises converging lenses 11 adapted to receive only the first laser beam groups L4 corresponding to the active zones 31, 31' conveyed by the additional spatial light modulator 4.

In an exemplary embodiment, laser radiation not corresponding to the active zones is diverted to a respective absorber (not shown in FIG. 1). In this manner, only the active zones selected in the encoding and error reducing steps of the method 200 of the invention are conveyed towards a detection region 12 of the system 100.

In particular, the system 100 comprises four converging lenses 11 in the example in FIG. 1. Such lenses are associated with the respective random or pseudo-random fields of the four computing devices which compute four different Boolean functions in the specific example independently and simultaneously.

Furthermore, the system 100 comprises the first electro-optical sensors 13 configured to convert the laser radiation concentrated by each lens 11 into a respective electrical signal E. In particular, the system 100 comprises four photodiodes 13. A respective amplifier device 14 is connected to the output of each photodiode 13.

The amplified electrical signal E1 or first electrical signal E1 output from the amplifiers 14 is proportional to the power or intensity of the integrated laser radiation on the area of the photodiodes 13.

Furthermore, the system 100 comprises comparators 15, e.g., with single-threshold or multiple-threshold, configured to receive the first electrical signals E1 as input. In particular, the thresholds of such comparators 15, ETHa if single threshold or ETHa1 and ETHa2 if double threshold, are chosen according to the superimposing step of the method of the invention.

As mentioned above, the modulator 3, according to the computing needs, is configured to control the M inputs of the Boolean function to be computed so that they take either logic high value or logic "1" (ON) or logic low value or logic "0" (OFF). The outputs U1 of the comparators 15, either single-threshold or multiple-threshold, are the output states of the computed target Boolean function F. In other words, the thresholds of the comparators 15 are representative of the activation thresholds, chosen according to the criteria described in the superimposing step of the method of the invention.

Note that other systems than that described above can be made to perform the suggested method for optically computing a Boolean function with M inputs.

In addition to the advantages already reported above, the method 200 for optically computing a Boolean function with M inputs and the related electro-optical computing system 100 have further advantages and achieve the preset purposes.

In particular, the suggested method 200 allows optically computing any Boolean function with M inputs. Such a function to be computed can be simply established by modifying a respective software program stored in a memory operatively associated with the electronic processing unit 9, 10 of the system 100 without requiring changes to the hardware structure of the system itself.

Therefore, the system 100 implementing the method of the invention is a universal programmable Boolean function generator.

An additional advantage is that, if modulators and high-definition CCDs are used, the method of the invention allows increasing the number of Boolean functions which can be computed or generated.

The invention further relates to a computer program comprising an application code executable by at least one electronic processing unit 9,10 of the electro-optical system 100 for computing one or more Boolean functions with M inputs, to implement the method 200 of the present invention.

In order to meet contingent needs, those skilled in the art may make changes and adaptations to the method and the electro-optical computing system for generating Boolean functions described above or can replace elements with others which are functionally equivalent without departing from the scope of the following claims. Each of the features described above as belonging to a possible embodiment can be implemented irrespective of the other embodiments described.

What is claimed is:

1. A method for optically computing a Boolean function with M inputs, with M≥1, implemented by an electro-optical computing system, said electro-optical computing system comprising:

a coherent or partially coherent light radiation source configured to make M input light beams available;

an optical modulation device adapted to generate modulated light beams from the M input light beams;

one or more light-diffusing devices operatively associated with the optical modulation device to receive said modulated light beams;

at least one electronic processing unit configured to control said optical modulation device; and one or more electro-optical sensors operatively associated with said at least one electronic processing unit, said method comprising steps of:

generating, by the optical modulation device, the modulated light beams consisting of $2^M$ combinations of said M input light beams, in each of said $2^M$ combinations, each input light beam being able to take an ON state or an OFF state;

making said modulated light beams available to said one or more light-diffusing devices to generate $2^M$ random or pseudo-random fields each associated with a combination of the modulated light beams, each random field being representative of a set of random light intensity variations of points in an observation space, each pseudo-random field being representative of a set of deterministic light intensity variations of points in the observation space;

deriving, by the at least one electronic processing unit by means of said one or more electro-optical sensors, $2^M$ Boolean fields each associated with one of said $2^M$ generated random or pseudo-random fields, based on a comparison of a light intensity of points of one or more regions of the observation space associated with each of the $2^M$ random or pseudo-random fields with at least one threshold light intensity value, each of said $2^M$ Boolean fields including:

first points of said one or more regions of the observation space in which a light intensity of the related random or pseudo-random field is greater than said at least one threshold light intensity value, said first points being representative of a logical 1;

second points of said one or more regions of the observation space(S) in which the light intensity of the related random or pseudo-random field is lower than said at least one threshold light intensity value, said second points being representative of a logical 0;

selecting a target Boolean function with M inputs to be computed;

identifying, by the at least one electronic processing unit, active points between the first and second points of each of the $2^M$ derived Boolean fields which satisfy the selected target Boolean function with M inputs, said active points optically encoding the Boolean function with M inputs; and computing, by the electro-optical computing system, the Boolean function with M inputs based on said identified active points.

2. The method of claim 1, wherein said deriving step comprises comparing the light intensity of the points of the one or more regions of the observation space associated with each of the $2^M$ random or pseudo-random fields with a first and at least a second threshold light intensity values, each of said $2^M$ Boolean fields including:

further first points of said one or more regions of the observation space in which the light intensity of the related random or pseudo-random field is between said first and at least a second threshold light intensity values, said further first points being representative of a logical 1;

further second points of said one or more regions of the observation space in which the light intensity of the related random or pseudo-random field is outside a light intensity range delimited by said first and at least a second threshold light intensity values, said further second points being representative of a logical 0.

3. The method of claim 1, wherein said computing step comprises the steps of:

conveying first light beams associated with the active points identified for each of the $2^M$ Boolean fields to a detection region of the electro-optical computing system;

comparing a light intensity conveyed into the detection region with at least one activation light intensity threshold value;

associating, with an output state of said Boolean function with M inputs:

a logical value 1 when the light intensity conveyed into the detection region is greater than said at least one activation light intensity threshold value, or a logical value 0 when the light intensity conveyed into the detection region is lower than said at least one activation light intensity threshold value.

4. The method of claim 3, wherein said conveying step comprises steps of:

diffusing said modulated light beams towards a further optical modulation device of the electro-optical computing system;

deviating, by the further optical modulation device, said first light beams associated with the identified active points towards at least one converging lens; and concentrating, by the at least one converging lens, said diverted first light beams to generate first light beams conveyed towards said detection region.

5. The method of claim 3, wherein said comparing step comprises further steps of:

detecting, through first electro-optical sensors of the electro-optical computing system, the light intensity conveyed into the detection region to convert the light intensity conveyed into the detection region into an electrical signal;

amplifying, by electronic amplification means, said electrical signal to generate a first electrical signal; and comparing said first electrical signal with at least one electrical activation threshold value associated with electronic comparison means, said at least one electrical activation threshold value being representative of said at least one activation light intensity threshold value.

6. The method for of claim 3, wherein said comparing step comprises comparing said first electrical signal with a first and at least a second electrical activation threshold values representative of a first and at least a second activation light intensity threshold values, respectively.

7. The method of claim 3, wherein, in case of a single threshold, the activation light intensity threshold value is computable with the equation:

$$THa = N * TH * k$$

where N is the number of active zones conveyed towards the detection region, TH is the at least one threshold light intensity value, k is an attenuation constant indicating by how much the active zone light intensity is attenuated in light transfer from the active zone to the detection region.

8. The method of claim 3, wherein, in case of a number of activation thresholds greater than or equal to two, the activation light intensity threshold is computable with the equation:

$$THaj = N * THj * k$$

where THj denotes the threshold light intensity values used in comparing the light intensity of the points of the one or more regions of the observation space associated with each of the $2^M$ random or pseudo-random fields with j=1, 2, 3, 4 . . . .

9. The method of claim 1, wherein said identifying step comprises steps of:

selecting, for each of the $2^M$ combinations of said M input light beams, from among the active points optically encoding the Boolean function with M inputs, first active points for each of which a modulus of a difference between the light intensity of the random or pseudo-random field at said active point and the at least one threshold light intensity value is always greater than a preset positive parameter; and computing, by the electro-optical computing system, the Boolean function with M inputs based on said selected first active points.

10. The method of claim 9, wherein said computing step comprises steps of:

conveying first light beams associated with the first active points identified for each of the $2^M$ Boolean fields towards a detection region of the electro-optical computing system;

comparing a light intensity conveyed into the detection region with at least one activation light intensity threshold value;

associating with an output state of said Boolean function with M inputs:

a logical value 1 when the light intensity conveyed into the detection region is greater than said at least one activation light intensity threshold value, or a logical value 0 when the light intensity conveyed into the detection region is lower than said at least one activation light intensity threshold value.

11. A non-transitory computer readable medium storing a computer program comprising an application code executable by at least one electronic processing unit of an electro-optical computing system for computing one or more Boolean functions with M inputs, with M≥1, to implement the method of claim 1.

12. An electro-optical computing system for computing one or more Boolean functions with M inputs, with M≥1, comprising:

a coherent or partially coherent light radiation source configured to make M input light beams available;

an optical modulation device adapted to generate modulated light beams from the M input light beams;

one or more light-diffusing devices operatively associated with the optical modulation device to receive said modulated light beams;

at least one electronic processing unit configured to control said optical modulation device;

one or more electro-optical sensors operatively associated with said at least one electronic processing unit;

a light reflection element adapted to receive diffused light beams from said one or more light-diffusing devices, said light reflection element being configured to convey the diffused light beams towards an observation space and/or towards a further optical modulation device controlled by the at least one electronic processing unit;

one or more converging lenses adapted to receive first light beams from the further optical modulation device to concentrate first light beams conveyed towards a detection region;

first electro-optical sensors configured to convert each of the conveyed first light beams into a respective electrical signal;

electronic amplification means connected on an output of the first electro-optical sensors to generate a first electrical signal from said electrical signal; and electronic comparison means, connected to the electronic amplification means to receive as input said first electric signal, said at least one electronic processing unit being configured to perform the method of claim 1.

13. The electro-optical computing system of claim 11, wherein said light reflection element is a reversibly movable mirror, by the at least one electronic processing unit, from a first operating position in which the diffused light beams are conveyed towards the observation space to a second operating position in which the diffused light beams are conveyed towards the further optical modulation device controlled by the at least one electronic processing unit.

14. The electro-optical computing system of claim 12, wherein said observation space is a plane of a charge-coupled sensor, or charge-coupled device (CCD) of a digital camera.

15. The electro-optical computing system of claim 12, further comprising:

first separators, made of absorbent material, placed between said one or more light-diffusing devices and the observation space; and second separators, similar to the first separators, placed between said one or more light-diffusing devices and the further optical modulation device.

* * * * *